Sept. 10, 1968  L. W. PARMATER ET AL  3,400,579
COMPRESSION TEST APPARATUS
Filed June 14, 1966  5 Sheets-Sheet 1
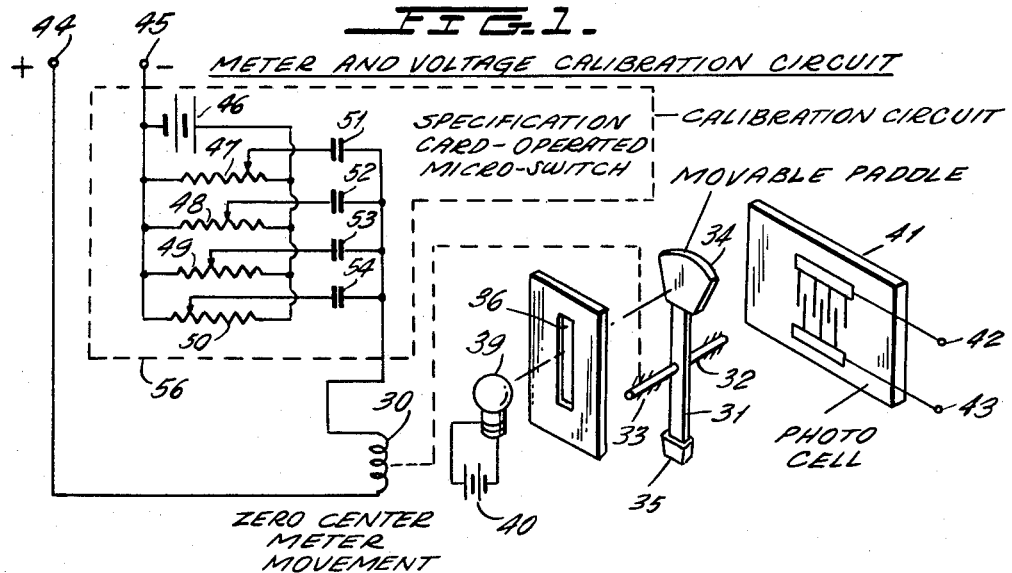
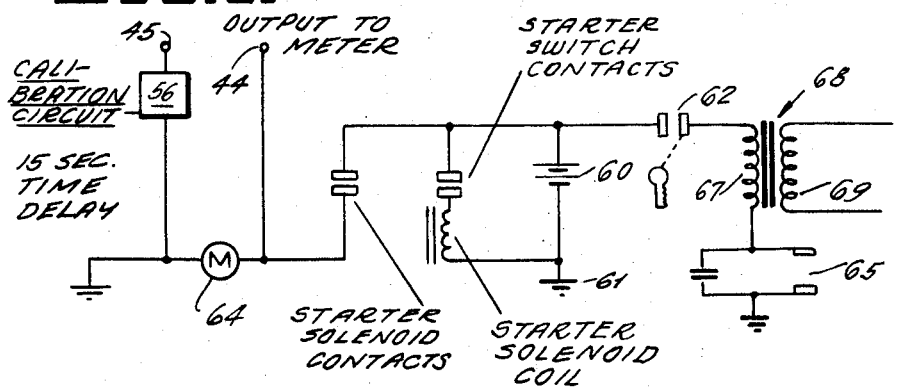
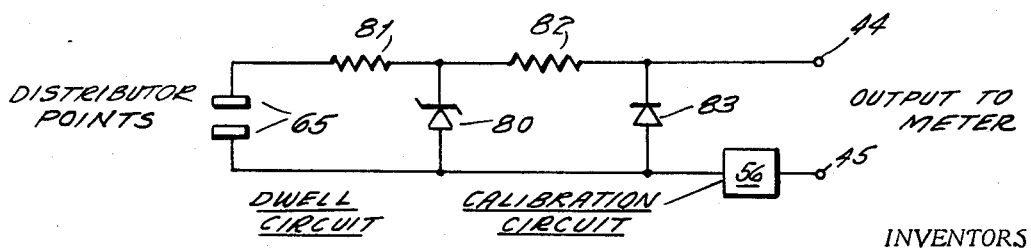
INVENTORS
LEE PARMATER
ROBERT M. CAIN
LAWRENCE J. WEISSERT
JOHN Q. PARMATER
BY
OSTROLENK, FABER, GERB & SOFFEN Sept. 10, 1968   L. W. PARMATER ET AL   3,400,579
COMPRESSION TEST APPARATUS
Filed June 14, 1966   5 Sheets-Sheet 2
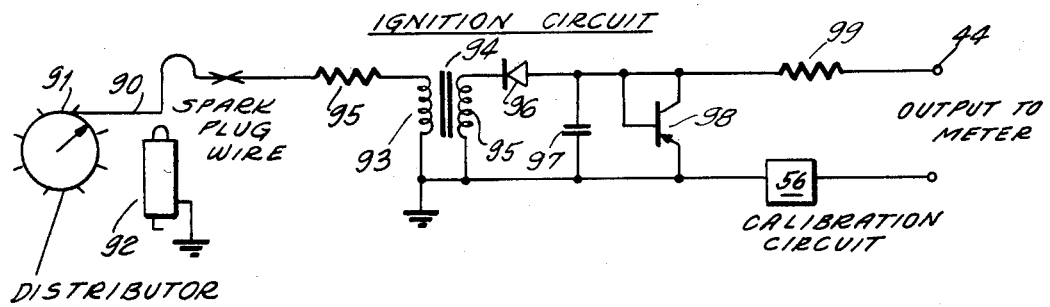
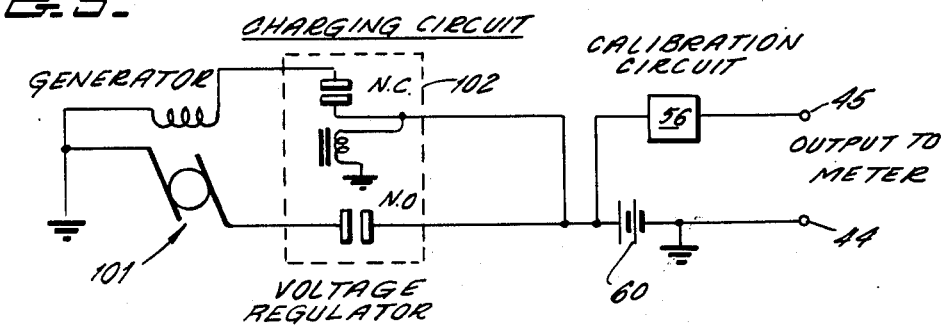
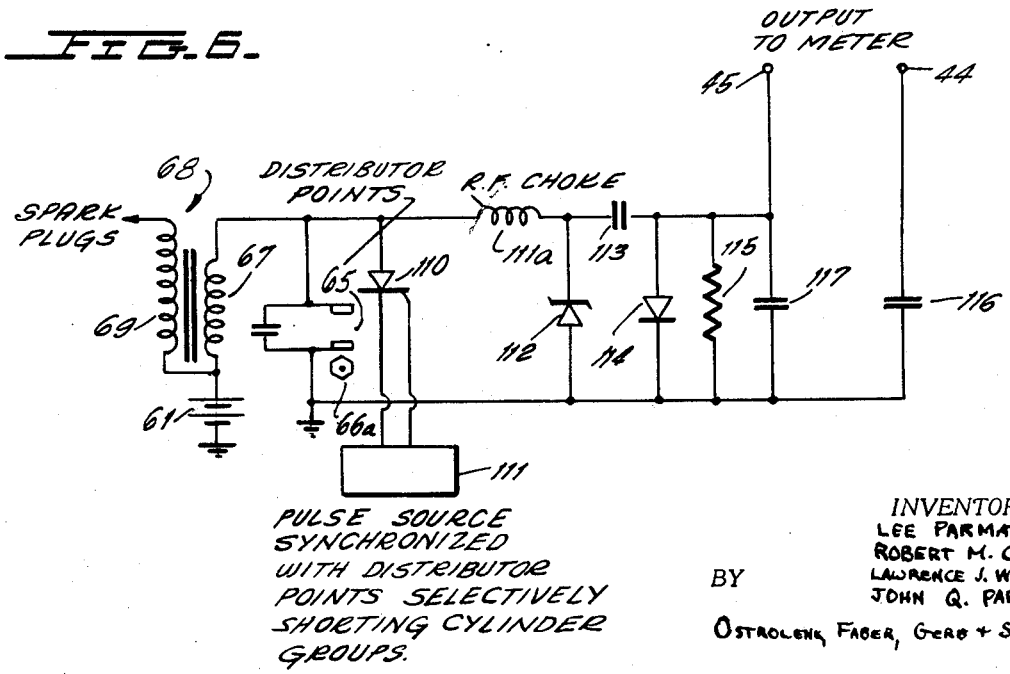
INVENTORS
LEE PARMATER,
ROBERT M. CAIN
LAWRENCE J. WEISSERT
JOHN Q. PARMATER
BY
OSTROLENK, FABER, GERB + SOFFEN Sept. 10, 1968   L. W. PARMATER ET AL   3,400,579
COMPRESSION TEST APPARATUS
Filed June 14, 1966   5 Sheets-Sheet 3
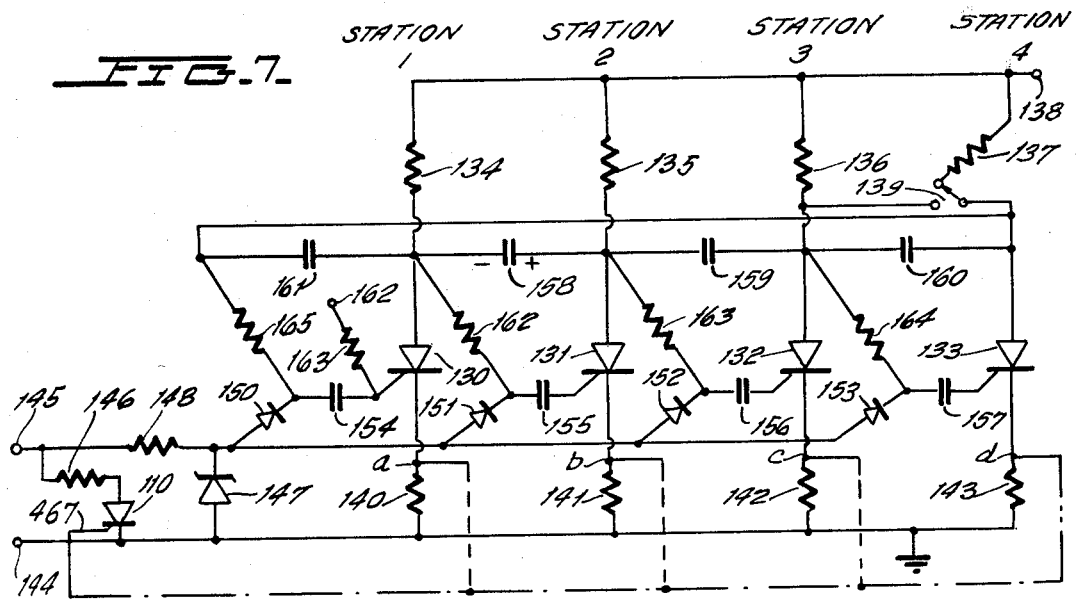
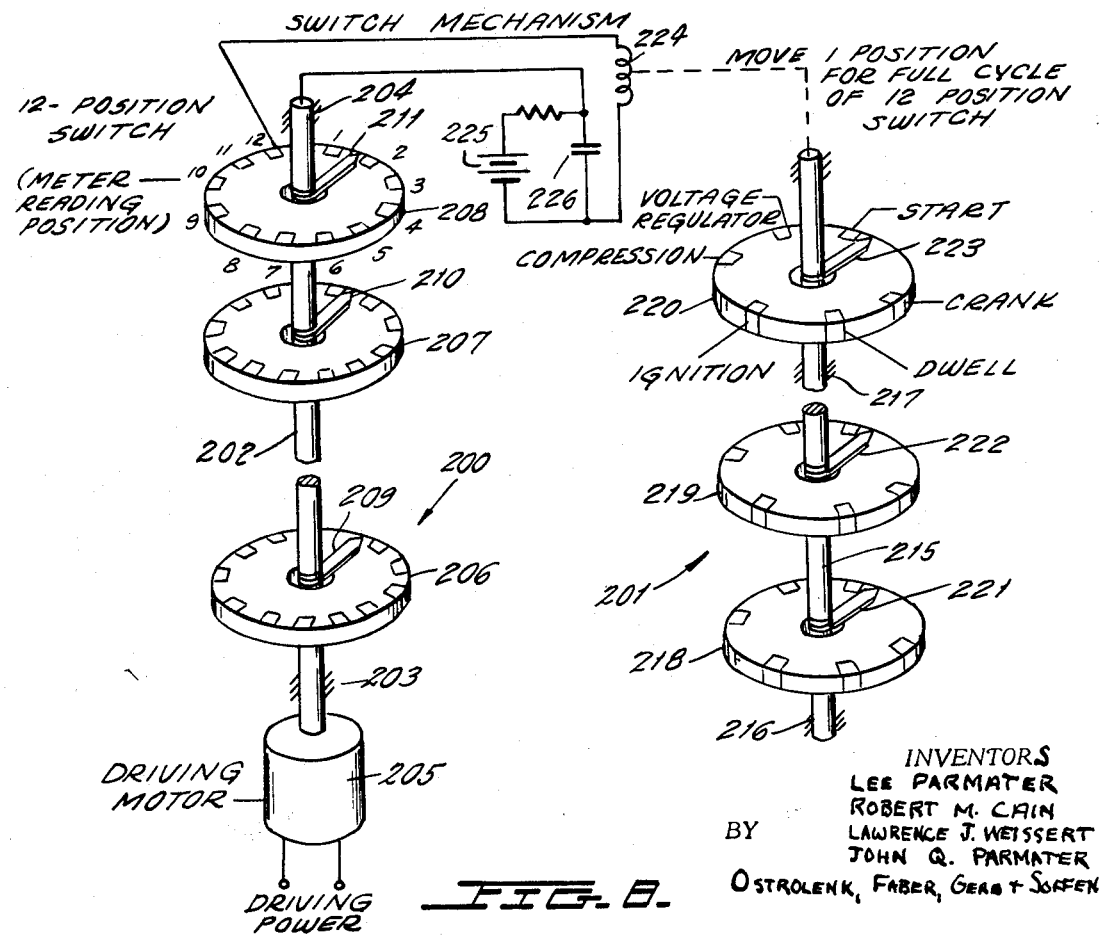
INVENTORS
LEE PARMATER
ROBERT M. CAIN
LAWRENCE J. WEISSERT
JOHN Q. PARMATER
BY
OSTROLENK, FABER, GERB + SOFFEN Sept. 10, 1968   L. W. PARMATER ET AL   3,400,579
COMPRESSION TEST APPARATUS
Filed June 14, 1966   5 Sheets-Sheet 4
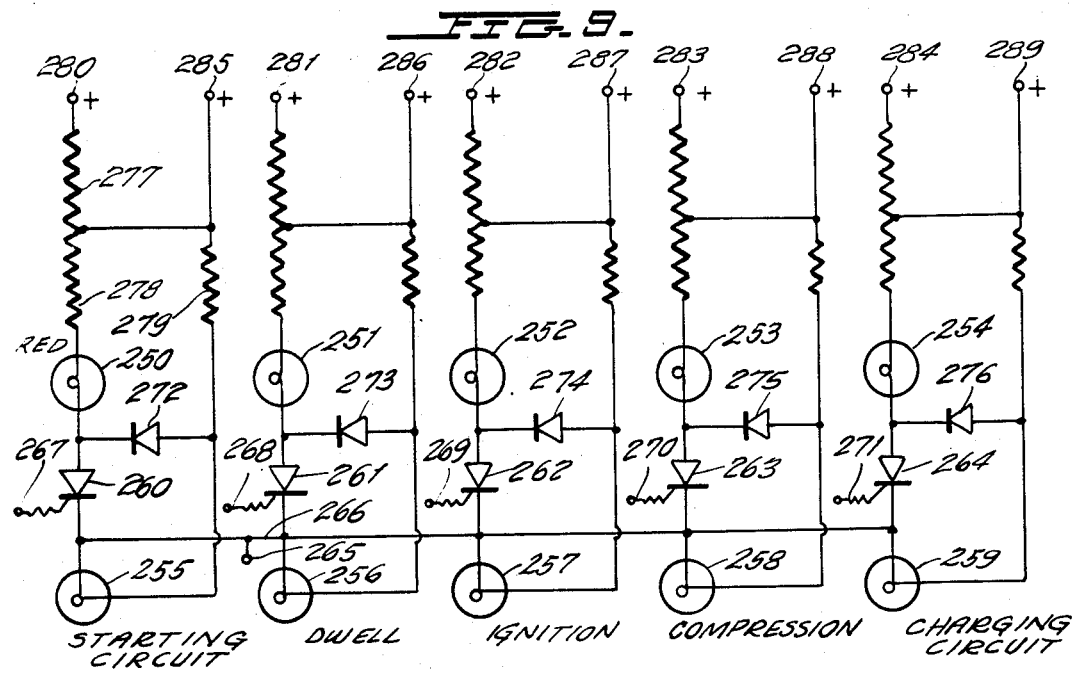
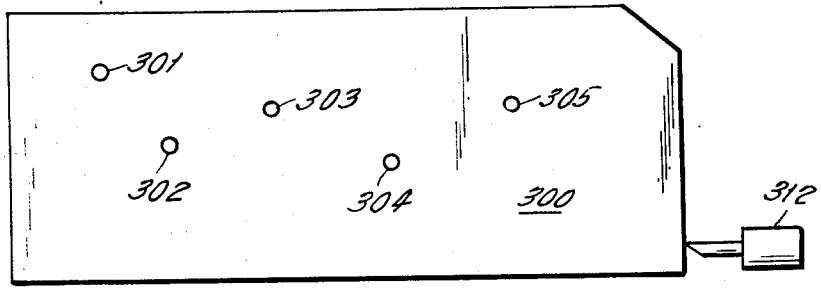
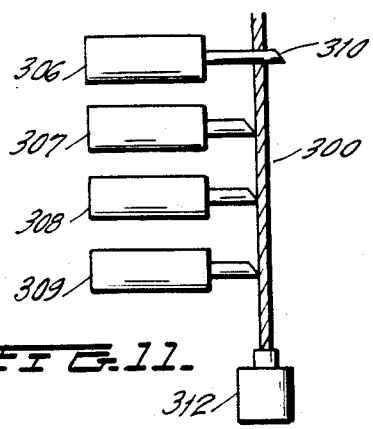
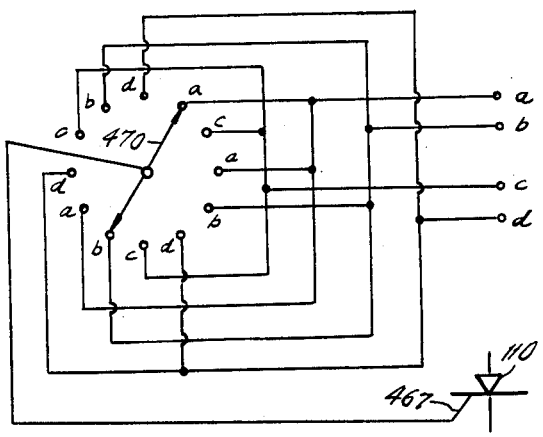

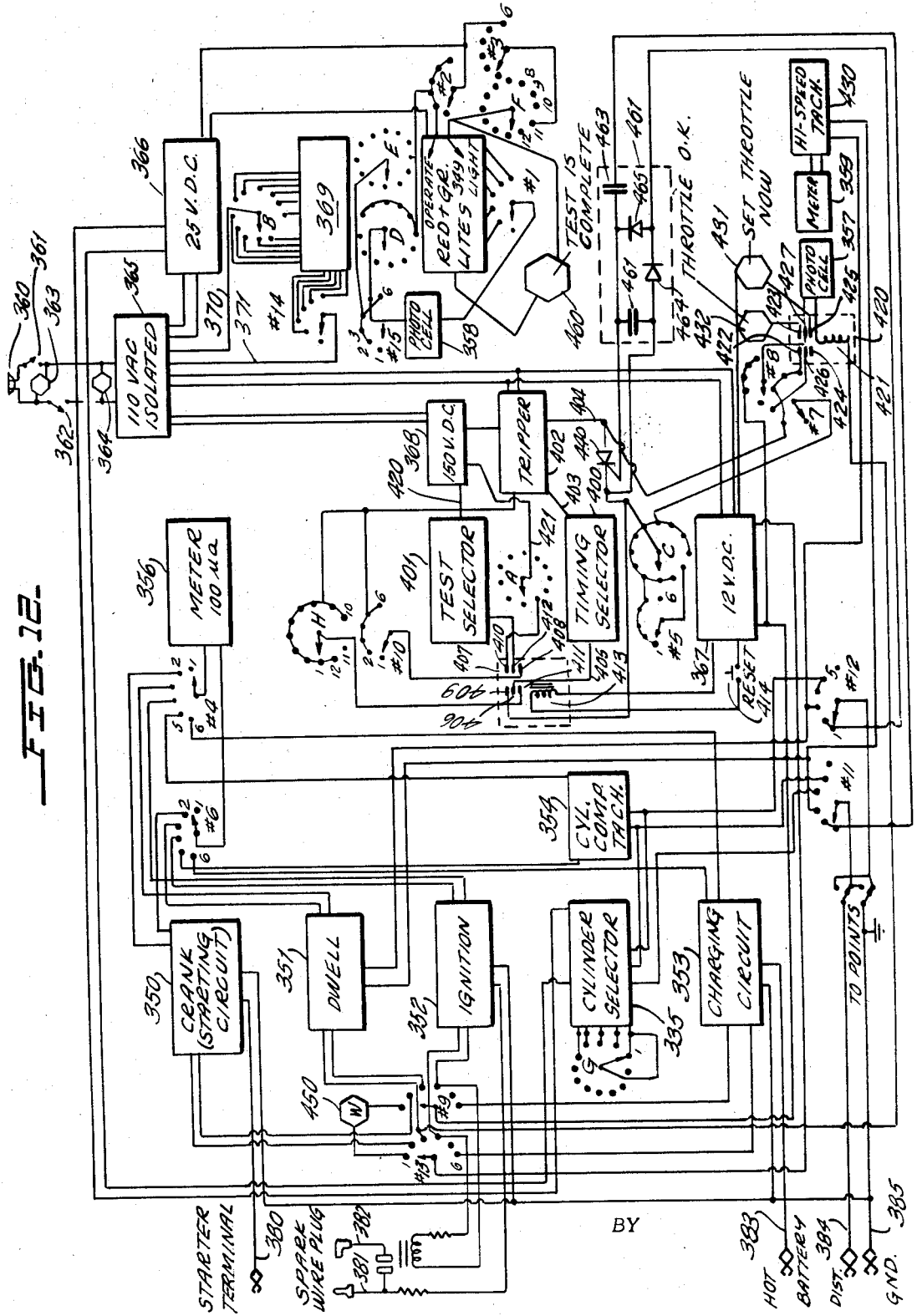

United States Patent Office 3,400,579
Patented Sept. 10, 1968

3,400,579
COMPRESSION TEST APPARATUS
Lee W. Parmater, Plainwell, Robert M. Cain, Kalamazoo, and Lawrence J. Weissert and John Q. Parmater, Otsego, Mich., assignors to Kal-Equip Company, Otsego, Mich., a corporation of Michigan
Filed June 14, 1966, Ser. No. 557,472
12 Claims. (Cl. 73—117.3)

ABSTRACT OF THE DISCLOSURE

A test apparatus for vehicles containing internal combustion engines contains a charging test circuit, a dwell test circuit, an ignition test circuit, a starting test circuit and a compression test circuit. Each of the individual test circuits are connected to the vehicle being tested and to a common meter device through an electrically operated sequential switching circuit in which the test circuits are sequentially connected to the vehicle and their outputs are sequentially connected to the common meter. A calibration circuit is connected to the meter for calibrating the meter in accordance with the particular test circuit connected thereto. The meter contains a centered paddle wheel which selectively interrupts a light beam directed toward a light-sensing device when the meter reading is above or below a preset range. The output of the light-sensing device then operates either a successful test or unsuccessful test indicator depending upon the positioning of the meter paddle.

This invention relates to automotive test apparatus and automotive test methods, and more particularly relates to a novel test apparatus in which a plurality of test functions are integrated with one another in a novel manner.

In accordance with the invention, a plurality of individual test circuits are integrated with one another and are connected to an internal combustion engine through a plurality of leads which extend from a test equipment console. A novel relaying circuit then sequentially connects the individual test circuits to the engine under test and further controls the operation of the engine to coordinate it with the particular test. The output of the individual test circuits are connected to a common indicating structure which is connected to suitable indicating lights, or another suitable annunciator which continually reports and records which test is in progress and the results of the test. The test apparatus of the invention, when applied to automotive vehicles is calibrated for a particular model by the provision of a punch card which has openings punched therein to permit operation of selected microswitches in a calibrating microswitch bank. Alternatively, a suitable tape, film, or other suitable calibrating control could be used. This controls the automatic calibration of the common indicator used for each of the tests for the known characteristics of a particular vehicle.

While the novel integrated apparatus of the invention can use any of the well known test circuits for testing various aspects of an automotive engine, a novel compression test scheme is provided wherein preselected groups of cylinders are intentionally and sequentially made inoperative, thereby to permit the isolation of inoperative cylinders in common groups of operating cylinders. That is, if, for any reason, one cylinder is not performing properly, it is very difficult to find this from a standard reading with tachometer equipment. Where, however, one of only a small group of cylinders is not working, the effect, as measured by a tachometer becomes immediately apparent. In accordance with the invention, each individual cylinder is caused to operate with different, and small groups of the cylinders available in the engine. All groups are then individually tested, and those groups which show a pronounced mal-operation, will each include the one (or more) malfunctioning cylinders, thereby to immediately identify the existence of a malfunctioning cylinder.

Accordingly, a primary object of this invention is to provide a novel integrated electrical testing apparatus for testing the operation of internal combustion engines, including the electrical equipment associated with the engine, whereby the motor is directly connected to the apparatus by a plurality of conductors with various engine and circuit malfunctions automatically indicated at the end of the test.

Another object of this invention is to provide a novel test apparatus for automotive vehicles which automatically tests and diagnoses faults in the automotive vehicle.

A further object of this invention is to provide the automatic high speed measurement of a plurality of parameters in an automotive vehicle.

Still another object of this invention is to provide the rapid evaluation of the performance of an automotive vehicle without requiring separate and independent evaluation by a mechanic.

Yet another object of this invention is to provide a novel compression test for internal combustion engines for quickly determining the presence of the faulty operation of one or more cylinders.

Yet another object of this invention is to provide a plurality of automotive test circuits which are integrated with one another for sequential operation.

Another object of this invention is to provide a novel test console apparatus for automotive vehicles which can be programmed in a simple manner for a particular vehicle type.

These and other objects of this invention will become apparent from the following description when taken in connection with the drawings, in which:

FIGURE 1 illustrates, in partial exploded perspective and partial circuit diagram form, the common indicating meter and calibration circuit therefor, which is used for all of the individual test circuits.

FIGURE 2 shows the circuit diagram of the test circuit which tests the vehicle starting circuit.

FIGURE 3 shows the circuit diagram of the circuit used for testing the dwell of the motor under test.

FIGURE 4 shows the circuit diagram of the circuit used for testing the ignition circuit of the motor under test.

FIGURE 5 shows the circuit diagram of the circuit used for testing the charging circuit (voltage regulator) of the vehicle under test.

FIGURE 6 shows the circuit diagram of the novel circuit used to test the compression of the individual cylinders of the motor under test.

FIGURE 7 shows a circuit diagram of a ring counter used in the compression test circuit of FIGURE 6 for selectively short circuiting groups of cylinders.

FIGURE 8 shows a perspective diagram of the switch mechanism for sequentially initiating and controlling the various tests to be made.

FIGURE 9 is a circuit diagram of the test result indicator for indicating that a particular test is completed successfully, or has shown a malfunction to exist.

FIGURE 10 is a plan view of a programming card having openings therein to permit calibration of the indicator of FIGURE 1 according to the characteristics of a particular vehicle.

FIGURE 11 is a side view, partially in cross-section, showing how a microswitch bank cooperates with one column of the card of FIGURE 10.

FIGURE 12 is a complete circuit diagram showing the relation between the individual test circuits, the switching mechanism, the measuring circuit and the indicating lights.

FIGURE 12a shows the cylinder selection deck in more detail than in FIGURE 12.

The novel test apparatus of the invention can serve to test any of the normally tested parameters of an internal combustion engine. In the following description of the invention, the following components are tested, although it will be clear that not all these circuits need be tested, and that other circuits could be tested.

(1) Starting circuit.
(2) Dwell.
(3) Ignition.
(4) Compression and ignition (of each cylinder).
(5) Charging circuit (voltage regulator).

These individual circuits have a common output indicator circuit, as shown in FIGURE 1, and are selectively and sequentially connected to the indicator circuit by switching means, as shown in FIGURE 8. The individual components of the novel system are first individually described as follows:

(A) METER AND VOLTAGE CALIBRATION CIRCUIT

An important feature of the present invention is that each of the test circuits is connected to the same meter which delivers a indication of the parameter measured by the particular circuit. Clearly, however, individual meters could be used, if desired. The single meter is calibrated for each test that its reading reflects the characteristics of the type of vehicle to which the instrument is connected so that the particular characteristics of the vehicle are taken into account in the meter.

Referring now to FIGURE 1, the measuring meter has a standard movement using a coil 30 which is connected to a rotatable pointer 31 carried on shaft 32 which is suitably mounted, as in bearings 33. Pointer 31 has a "paddle" extension 34 and a counter balance weight 35. A slot 36 in panel 37 which is suitably carried in the instrument housing is then placed between light bulb 39 and pointer 34. A suitable voltage source 40 is provided to energize bulb 39. Paddle 34 is positioned between slot 36 and a suitable photocell 41, shown as a cadmium sulfide cell, which has output leads 42 and 43. As will be described, the paddle 34 is rotatable over a range, depending upon its width, in which light from slot 36 is falling on photocell 41. Thus, if the circuit connected to the meter generates a voltage which moves the paddle to one side or the other of slot 36, light will impinge upon cell 41, thereby indicating that the output voltage is either below or above the desired or permissible range.

The input circuit to the meter, and particularly to coil 30 of the meter includes terminals 44 and 45 which are connected to the positive and negative leads, respectively, of the particular circuit which is to be connected to the meter. As an important feature of the invention, the meter is caused to be a zero centered movement when a voltage in a correct range is applied to terminals 44 and 45. More generally, however, it is desirable only for the meter to have a zero reading with pointer movement permissible to either side of the zero position. To this end, a bucking voltage from auxiliary battery 46 is connected in series with terminals 44, 45 and coil 30. Since the range of output voltage connected to terminals 44 and 45 will differ (for normal operation indication) depending upon the type vehicle under test, and the specific test being made, a voltage calibration circuit is provided which typically includes tapped resistors 47, 48, 49 and 50 which are in parallel with battery 46 and have their output tap leads in series with respective microswitch contacts 51, 52, 53 and 54 and coil 30. As will be described more fully hereinafter, the particular compensation resistors to be used is selected from a punched card, or by any other suitable selection means, which closes one of switches 51 through 54, depending upon the characteristics of the vehicle being tested. Note that as many separate calibrating resistors as necessary will be used, and four have been shown in FIGURE 1 for purposes of illustration only. Note further that the complete compensation circuit can be carried in a separate housing, schematically shown in dotted line 56 which is connected in the input lead of the separately housed meter. Moreover, any other type of calibration adjustment could be used as individually adjustable resistors, and the like.

In operation, if the test circuits being monitored delivers an output voltage to terminals 44 and 45, in a range previously assigned as indicating normal operation of the function being tested, the pointer 31 will be centered and paddle 34 will cover slot 36 so that no light from lamp 39 will hit photocell 41. If, however, the voltage applied to terminals 44 and 45 is outside the previously designated "normal" range, and is too low or too high, the paddle 34 will move sufficiently to the left or right, respectively, to permit light from bulb 39 to impinge on cell 41, thereby to change the resistance of photocell 41 between terminals 42 and 43. This will then permit the generation of a signal, as will be later described to indicate a malfunction in the function being tested.

Note that the voltage range for normal operation can be controlled by adjustment of the relative widths of paddle 34 and slot 36.

(B) STARTING CIRCUIT TEST CIRCUIT

The circuit used for the starting circuit test is shown in FIGURE 2 and includes the automobile battery 60 which has its negative terminal grounded to the vehicle ground 61. Battery 60 is connected in series with the starting switch contacts 62, normally operable to a closed circuit position by ignition key 63, and starter motor 64. Note that the complete relaying structure, to be described, will automatically short circuit contacts 65 for the time duration of the starting circuit test. The positive terminal of battery 60 is connected in series from ground 61 to the distributor points 65 which are operated in the usual manner by cam shaft 66a. The distributor points 65 are then in parallel with the usual capacitor 66 and in series with the primary winding 67 of transformer or ignition coil 68 having secondary winding 69.

The voltage across motor 64 is then applied from the meter terminals 44 and 45 (FIGURE 1) through the calibration circuit 56 to meter terminals 44 and 45. A contact in the switching mechanism, which will be described in detail later, short circuits the distributor points 65 during the cranking test so that the vehicle motor starting is prevented. Clearly, the compensation circuit 56 will adjust to the meter calibration for the particular model vehicle being tested, which includes the normal rated voltage of the battery 60.

By measuring the voltage across the starter 64, the test will automatically include a test of the starter motor, cables, battery, connections, solenoid, and all other elements of the starting circuit. In addition, by making the voltage measurement only after fifteen seconds of cranking, the test will test the battery capacity.

If the measured voltage falls within the predetermined range indicating satisfactory operation of the starting circuit, paddle 34 of FIGURE 1 will block slot 36 so that an indicator can be turned on indicating a successful test. If, however, the voltage drop is too low, or too high, paddle 34 will be moved to one side or the other of slot 36, so that photocell 41 is energized and an indicator indicating test failure is turned on.

At the completion of the starting circuit test (whether successful or unsuccessful), the test equipment automatically goes into a second test mode for the distributor contact dwell.

(C) DWELL TEST CIRCUIT

The circuit for testing dwell is shown in FIGURE 3, and includes a Zener diode 80 (which may be a 5.6 volt Zener) and resistor 81 connected across the distributor points 65. A resistor 82 and Zener diode 83 are then connected across Zener 80 and the output terminals 44 and 45, and compensation circuit 56 are connected across Zener diode 83.

As will be seen more fully hereinafter, at the end of the cranking test, the distributor contacts become operative (they were shorted during the cranking test) and the engine is given sufficient time to come up to approximately 2000 r.p.m. A tachometer circuit intermediately connected to the motor, to be described hereinafter, prevents connection of the dwell circuit to the meter until the motor is up to sufficient speed. The meter is connected in the circuit of FIGURE 3 after the engine has come up to speed.

In FIGURE 3, a constant reverse voltage drop exists across Zener 80 (and output diode 83) as long as distributor points 65 are open. The average value of this voltage is, therefore, proportional to the length of time the contacts 65 are opened, and inversely proportional to the dwell, or length of time distributor contacts 65 are closed. The desired dwell range of any motor vehicle is known, and, therefore, can be programmed into the meter of FIGURE 1 by appropriately adjusting the calibration circuit 56.

As with the starting circuit test of FIGURE 2, a successful test is indicated by blocking the slot 36 with paddle 34 of FIGURE 1, while unsuccessful test is indicated when light is passed through slot 36 to photocell 41. Suitable test result lights may then be energized to report the test results to the mechanic. Thereafter, the test system automatically goes into its ignition circuit test mode.

(D) IGNITION CIRCUIT TEST CIRCUIT

The ignition circuit used in the novel test unit is shown in FIGURE 4 and operates to test the ignition circuit components by measuring the voltage applied to any arbitrarily selected spark plug. In FIGURE 4, one of the spark plug wire leads 90 extending from distributor 91 is disconnected from its spark plug 92, and is connected to grounded primary winding 93 of step down transformer 94, through a high resistance 95 (three megohms). Secondary winding 95 is connected in parallel with diode 96 and capacitor 97, with the voltage of capacitor 97 connected to the base-emitter circuit of transistor 98.

The output of transistor 98 is then some relatively low voltage, related to the voltage applied from the ignition circuit to the spark plug gap, and is connected in the measuring meter circuit through resistor 99. Clearly, calibration circuit 56 is suitably adjusted for this particular test, dependent on the vehicle tested, with the test results dependent on the movement of paddle 34 of FIGURE 1. Thereafter, the test unit automatically switches to its charging circuit mode of operation, as shown in FIGURE 5.

(E) CHARGING CIRCUIT TEST CIRCUIT

The charging circuit test arrangement shown in FIGURE 5 tests the operation of the generator and voltage regulator by measuring the voltage across the motor vehicle battery 60 (FIGURE 2). Thus, the battery 60 is connected across the calibration circuit 56 and terminals 44 and 45. The charging circuit includes the motor vehicle generator 101, and the motor vehicle regulator circuit shown in dotted lines 102.

If, during operation of the motor of the vehicle under test, the generator 101 or regulator 102 is not operating properly, this will be reflected in the output voltage measured across the terminals of battery 60, and will be indicated by the indicating meter in the manner previously described. Thereafter, the test unit moves into its compression test, as shown in FIGURE 6.

(F) COMPRESSION TEST CIRCUIT

An important feature of the present invention is in the use of a tachometer measuring device for testing the compression of the various cylinders and isolating one or more defective cylinders from the remaining cylinders. Measurement of motor speed to determine proper cylinder operation has not, heretofore, been effective as a compression test, since one faulty cylinder out of the six or eight normally available in the motor will not cause an easily measured or significant change in engine speed. However, as the total number of cylinders decreases, the effect of a single defective cylinder on motor speed becomes more noticeable. In accordance with the invention, groups of cylinders are selectively intentionally deactivated and a tachometer test is made of the remaining cylinders. For example, in an eight cylinder motor, four cylinders are simultaneously intentionally deactivated, and the motor speed due to the operation of the remaining cylinders is then measured. Thereafter, different groups of four cylinders are consecutively deactivated, and the corresponding motor speed is measured. If only one of the cylinders of any group of four operating cylinders does not operate properly, it will cause a measurable change in motor speed as compared to another group of four cylinders, each of which is operative. This speed change can be detected in a tachometer measuring motor speed for the various groups, and a change in speed for any of the groups can cause an indication of a defective cylinder.

As a specific example, assume a motor has eight cylinders which fire in the sequence 1-2-3-4-5-6-7-8. A cylinder deactivating structure which will be described in FIGURE 7 then has four stations, each of which are synchronized to deactivate cylinders 1-5, 2-6, 3-7 and 4-8. Pairs of stations are then energized to deactivate cylinders in the following order. The cylinders can be grouped into six groups formed of the following cylinders:

| Group No.: | Cylinders deactivated |
|---|---|
| 1 (stations 1 and 2) | 1, 5, 2, 6 |
| 2 (stations 1 and 3) | 1, 5, 3, 7 |
| 3 (stations 1 and 4) | 1, 5, 4, 8 |
| 4 (stations 2 and 3) | 2, 6, 3, 7 |
| 5 (stations 2 and 4) | 2, 6, 4, 8 |
| 6 (stations 3 and 4) | 3, 7, 4, 8 |

As can be seen from the above chart, the cylinder selection procedure compares combinations of all good cylinders to combinations containing the malfunctioning cylinder or cylinders. (Note that this exemplary procedure would not detect two combinations of defective cylinders, 1, 2, 3, 4 or 5, 6, 7, 8. The chance of these combinations occurring, however, is very small.)

It will be clear that the following concept could be readily applied to motors having any number of cylinders, and different test groups could be selected, as desired.

FIGURE 6 shows the tachometer circuit along with the novel cylinder deactivating circuit that can be used in accordance with the invention. Referring to FIGURE 6, there is the standard ignition coil 68 associated with the vehicle battery 61, distributor points 65 and cam shaft 66 in the usual manner.

A controlled rectifier 110 is then provided with its cathode and anode terminals across the distributor points 65. Pulse source 111, which is described in FIGURE 7, is then connected to the gate circuit of the controlled rectifier 110 to fire controlled rectifier 110 at selected times synchronized with cylinder operation so that selected cylinders are prevented from firing by shorting the distributor points 65 (and thereby defining the groups of cylinders that will remain operative).

The tachometer portion of the circuit of FIGURE 6 includes an R.F. choke coil 111a and Zener diode 112 connected across the distributor points 65. A capacitor 113, which may be an 0.8 microfarad capacitor and diode 114 are then in closed series connection with Zener 112. Diode 114 is shunted by a resistor 115 and a 500 microfarad capacitor 117. The upper terminal of resistor 115 and capacitor 117 are connected to terminal 45 of the meter of FIGURE 1. The terminal 44 and calibrating circuit are then connected to capacitor 116 which is in turn connected to the bottom of resistor 115. Capacitor 116 may be a 3 volt, 500 microfarad capacitor.

The above noted circuit is such that the meter of FIGURE 1 will normally be centered. That is, the average voltage across resistor 115 will be related to the motor speed. When distributor points 65 are open, voltage appears across Zener 112. The magnitude of this voltage is determined by Zener 112. The voltage across Zener 112 causes a current through diode 114 which charges capacitor 113. When the points 65 are closed capacitor 113 discharges through R.F. choke 111a, distributor points 65 and resistor 115. This discharge current causes a voltage drop across resistor 115. The average voltage across resistor 115 is determined by the frequency of discharges of capacitor 113. Capacitor 117 has an averaging effect on the voltage across resistor 115 keeping it steady.

Current passing through meter coil 30 connected to terminals 44 and 45 charges capacitor 116 to a voltage equal to the voltage across capacitor 117. When the engine is running at a constant speed, the voltages on capacitors 116 and 117 are equal. When engine speed is decreased, due to a defective cylinder in the selected group, the voltage on 117 will decrease and capacitor 116 will discharge through meter coil 30 causing a meter deflection until capacitors 116 and 117 are again equal in voltage. When engine speed is increased current passes from capacitor 117 through meter coil 30 to capacitor 116. Thus a change in engine speed causes a meter deflection while a constant engine speed allows the meter to remain stationary.

Note that the mode of operation of the meter of FIGURE 1 connected to the circuit of FIGURE 6 is not for the measurement of voltage, but merely to compare the readings of the various tests of various groups of cylinders. Thus, the output test results will show only that the cylinder groups did not behave in the same manner so that one or more cylinders are not operating properly. More detailed testing can then be performed by the mechanic.

Thus, when going from the first tested group of cylinders to the next group of cylinders, if a faulty cylinder is in the new group, the motor speed will noticeably decrease. This will cause a change in the average voltage across Zener 112 and capacitor 117, causing current flow to the movement of the meter connected to terminals 44 and 45 until capacitor 116 is sufficiently charged to prevent further current flow. The meter moves off zero during this current flow until the voltages of capacitors 116 and 117 equalize so the paddle 34 will expose slot 36. Thus, an output signal can be developed indicating a speed change.

Tests of the next groups proceed in the same manner with the meter current decreased to zero at the beginning of each test so that a comparison can be made with the other groups tested.

FIGURE 7 shows a typical ring counter circuit which can be used as the pulse source 111 of FIGURE 6.

Referring to FIGURE 7, the ring counter is comprised of four controlled rectifiers 130 through 133, respectively, and is intended for testing an eight cylinder vehicle. Each anode of controlled rectifiers 130 through 133 is connected through 600 ohm resistors 134, 135, 136, and 137 to the positive terminal 138 of a twenty-five volt D-C source. Note that resistor 137 is connected through a cylinder number selector switch means 139, which can short circuit the ring counter stage including controlled rectifier 133 to convert the counter to a three stage counter for use with six cylinder vehicles. The switch 139 can be controlled by the programming device, as will be later described.

The cathodes of each of the controlled rectifiers 130–133 are then connected to ground through 39-ohm resistors 140 through 143, respectively. Selected pairs of the junctions between controlled rectifiers 130–133 and resistors 140 through 143 are connectable through the switching mechanism, as will be described, to the gate electrode of controlled rectifier 110 (FIGURE 6) which is the switching means responsible for the selective short-circuiting of the distributor points 65 in FIGURE 6. It will be noted that terminals 144 and 145 in FIGURE 7 are connected to ground and the distributor points, respectively. Further note that a current limiting resistor 146 is connected in series with controlled rectifier 110 in FIGURE 7, and that a Zener diode 147 is connected in parallel with controlled rectifier 110 and in series with voltage dropping resistor 148.

The ring counter circuit is then completed by diodes 150, 151, 152 and 153 connected to the distributor points and connected in series with capacitors 154, 155, 156 and 157 connected to the gate electrodes of controlled rectifiers 130–133, respectively. The anodes of adjacent controlled rectifiers 130–133 are then coupled together by capacitors 158, 159, 160 and 161, respectively, while resistors 162, 163, 164 and 165 connect the anodes of controlled rectifiers 130–133 to the junctions of diode and capacitor pairs 151–155, 152–156, 153–157 and 150–154, respectively.

The operation of the ring counter of FIGURE 7 is initiated by the application of a firing pulse to input terminal 162 connected to the gate of controlled rectifier 130 through resistor 163. This pulse is obtained through the switching mechanism which will be described. The ring counter will thereafter automatically sequentially fire controlled rectifiers 130–133 each time there is a pulse obtained from the distributor.

In operation, and assuming that controlled rectifier 130 is in conduction while controlled rectifiers 131–133 are extinguished, when the distributor points open, only diode 151 can conduct forward current through the conducting controlled rectifier 130 since the other diodes 150, 152 and 153 are sufficiently reverse biased by the voltage at terminal 138 to prevent their forward conduction. The forward conduction of diode 151 permits the application of a firing signal to the gate of controlled rectifier 131 through capacitor 155 so controlled rectifier 131 fires. The firing of controlled rectifier 131 permits capacitor 158, which was charged as shown, to discharge in the closed circuit including controlled rectifier 131, resistors 140 and 141 and controlled rectifier 130, thereby to buck down the forward current of, and extinguish, controlled rectifier 130. Current flow is now established through controlled rectifier 131 and a voltage drop appears across resistor 141. If the junction between resistor 141 and controlled rectifier 131 is connected to the gate of controlled rectifier 110, this device will fire to short circuit the distributor points. It is to be noted that this operation is sufficiently fast to short circuit the distributor points and ignition coil sufficiently fast to prevent the coil voltage from building up high enough to fire the associated spark plug. Thus, the cylinder that should have operated when the points opened, will be deactivated before its plug is fired.

This operation then proceeds in an identical manner for successive cylinders so that each time the points operate, the next successive controlled rectifier of controlled rectifiers 130–133 will be fired to put a voltage drop across resistors 140–143, respectively, and to turn off the previously conducting controlled rectifier. Whether or not the appropriate cylinder will be deactivated depends only on whether the switching mechanism has connected one or more of resistors 140–143 to controlled rectifier 110 when they see their voltage drop.

The circuit of FIGURE 7 is used for an eight cylinder vehicle when switch 139 is connected as shown, and for a six cylinder when switch 139 is in its other position.

Thus, each of the controlled rectifiers will control two cylinders (such as the first and fifth to fire, or the second and sixth to fire).

Clearly, however, any other suitable arrangement could be used. Moreover, the novel system of FIGURE 7 could be adapted to manual cylinder selection, if desired, to permit further diagnostic study to isolate one or more defective cylinders

(G) SWITCHING MECHANISM

The various circuit tests described in FIGURES 2 through 7 have been described as automatically proceeding in a predetermined automatic sequence. FIGURE 8 shows, in perspective view, the switching mechanism used in the control circuitry for sequencing the tests. Referring to FIGURE 8, the switch mechanism includes two ganged, automatically driven switch assemblies 200 and 201.

Switch assembly 200 is a multideck switch which has a common operating shaft 202 supported in bearings 203 and 204 which is driven by a suitable driving solenoid motor 205 which drives shaft 202 with intermittent rotary motion in the well known manner. A plurality of decks, such as decks 206, 207 and 208 are suitably supported with respect to shaft 202, and each carry twelve contacts disposed about their outer peripheries in the usual manner. Movable contact arms 209, 210 and 211 associated with decks 206, 207 and 208, respectively, are driven from shaft 202 and make sequential contact with the peripheral stationary contacts of their respective decks. Thus, circuits connected between the rotating pointer and the various peripheral stationary contacts will be normally open, and closed when the movable contact engages a particular peripheral contact.

Switch assembly 201 is a solenoid operated type switch mechanism which is advanced one contact position each time shaft 202 of assembly 200 completes a full revolution. Assembly 201 comprises a rotatable shaft 215 supported by bearings 216 and 217 and a plurality of relatively stationary decks, three of which are shown as decks 218, 219 and 220. Each of the decks have six peripheral contacts, each of which correspond to a particular circuit function to be tested. In actuality, twelve contact position decks, similar to those of assembly 200, have been used with opposite contacts connected together. Thus, a 180° rotation of the decks of assembly 201 moves the deck thorough its full contact cycle. For purposes of simplicity these decks are shown as six position decks which move through a full contact cycle in 360° of rotation. Rotatable pointers 221, 222 and 223 are carried by shaft 215 and rotated around the stationary contacts of their respective decks.

Shaft 215 is then associated in a suitable manner with a solenoid coil 224 which is operative to rotate shaft 215 through one full contact position (60° where a six contact deck is used) each time coil 224 is energized. In order to coordinate the operation of switch mechanisms 200 and 201, the energizing circuit for coil 224 includes a D-C source 225 connected in series with shaft 203, the twelfth position contact of deck 208, and in parallel with capacitor 226. Thus, each time pointer 211 of deck 208 completes a full rotation and engages the last contact position, solenoid coil 224 is energized by the discharge of capacitor 226 and shaft 215 will advance one contact position.

(H) TEST RESULT INDICATORS

The test result indicators for indicating a successful or unsuccessful test are shown in FIGURE 9 with a red lamp ignited to show an unsuccessful test and a green lamp to show a successful test. It has been found advantageous to illuminate these lamps only at the end of the full test sequence so that the circuit of FIGURE 9 further employs a novel "memory" means to retain the test result pattern and to display it only at the end of the sequence.

These lamps are suitably mounted on the exterior of the chassis housing the equipment. Referring to FIGURE 9, red test failure lamps 250 through 254 each correspond to the labeled test beneath the circuit including the lamps. (Starting circuit, Dwell, Ignition, Compression, and Charging Circuit, respectively.) In a similar manner, green successful test lamps 255 through 259 are also provided for each test. Controlled rectifiers 260 through 264, respectively, are then connected between their respective red and green lamps as shown.

The output from the photocell 41 is then connected from the terminal 265 of negative bus 266 to one of gate terminals 267 through 271 as dictated by the switching mechanism, as will be described. The anode of each of the controlled rectifiers is then connected to diodes 272 through 276, as shown, with a parallel circuit including resistors 277 through 279 (labeled for the starting circuit only) each having terminals 280–284 which are selectively connected by the switching mechanism to the particular test indicator of FIGURE 9 during the progress of the test to the positive terminal of a 25 volt A-C source. The negative terminal of this source is connected to negative terminal 265. Second positive terminals 285–289 are further provided for each of the circuits of FIGURE 9 which are connected to the 25 volt D-C source at the end of the full test sequence to permit the simultaneous energization of the appropriate light of each group.

In operation, and considering the starting circuit as typical, terminal 280 is connected to the positive voltage source, but if the particular test is successful, there is no voltage output from the photocell of FIGURE 1, so controlled rectifier 260 is not fired. Therefore, current can only flow from terminal 280 through resistors 277 and 279, lamp 255, and negative terminal 265. The resistance of resistor 277, however, is sufficiently high to prevent illumination of the bulb. If, however, the test was unsuccessful, a voltage will be applied from the photocell to gate 267 so that controlled rectifier 260 is fired under the influence of the voltage at terminal 280. This completes a current path from terminal 280, resistor 277, resistor 278, lamp 250, controlled rectifier 260 and terminal 265. Again the resistance of resistor 277 is high enough to prevent ilumination of lamp 260. At the end of the full test sequence, terminals 285–289 are also connected to the 25 volt source, and, since each of these terminals by-pass resistors 277, they will permit sufficient current flow to the "preconditioned" lamps 250–254 and 255–259 to cause their simultaneous illumination.

(I) PROGRAMMING MECHANISM

As described for the individual tests of FIGURES 2 through 6, it is necessary to properly adjust the compensating circuit 56 of FIGURE 1 for the various tests, depending on the characteristics or specifications of the vehicle being tested. This preadjustment can be made through a series of adjustment knobs on the instrument housing which control adjustable resistors, or the like, but it is advantageous to make such adjustment through the use of a business machine programming type card which could selectively permit or prevent operation of microswitches such as switches 51 through 54 of FIGURE 1. In one device, which has been found satisfactory, there were five aligned rows (each row corresponding to one of the five tests to be made) of as many switches as needed to cover the full calibrating range for the instrument of FIGURE 1.

FIGURE 10 illustrates a typical programming card 300 which has five pre-punched calibrating openings 301, 302, 303, 304 and 305 therein, each corresponding to one of the five tests. Five columns of four microswitches each are then arranged behind the card columns including openings 301 through 305 where the existence of an opening in front of one of the microswitches permits it to operate. Thus, in FIGURE 11, the column of microswitches in the column including opening 301 are shown as microswitches 306, 307, 308 and 309, respectively. Opening 301 is aligned with the switch operator 310 of FIGURE 10, so this switch can operate to a closed position, thereby to place a suitable calibrating resistance in the circuit of FIGURE 1. Each of the remaining rows similarly permit connection of a suitable compensating resistor in the circuit of FIGURE 1, depending upon the location of the respective card opening.

In order to indicate that a card is, in fact, in position so the test can proceed, a card presence microswitch 312 is provided in FIGURES 10 and 11 to indicate the presence of a card.

(J) THE INTEGRATED APPARATUS

All of the components and circuits of FIGURES 1–11 are integrated into an overall test instrument, as shown in FIGURE 12. Thus, in FIGURE 12, the indicator display lights of FIGURE 9 are shown as block 349; the starting circuit of FIGURE 2 is shown as block 350; the dwell circuit of FIGURE 3 is shown as block 351; the ignition circuit of FIGURE 4 is shown as block 352; the charging circuit of FIGURE 5 is shown as block 353; the compression test circuit of FIGURE 6 is shown as block 354 and the cylinder selector of FIGURE 7 is shown as block 355. The meter circuit and structure of FIGURE 1 excluding the photocell and voltage source 46 and including the compensation circuit and the card calibrating apparatus of FIGURES 10 and 11 are shown in block 356. Note that the photocell 41 is illustrated as two separate blocks 357 and 358 and is shown in two separate locations for ease of following the circuit, and, similarly, the meter of FIGURE 1 is also shown in block 359 at the lower right-hand corner of FIGURE 12. As will be understood from the foregoing, the tachometer formed of blocks 357 and 359 could in fact be a wholly separate circuit from the normal meter circuit used in the various tests.

The various decks of switch mechanisms 200 and 201 of FIGURE 8 are distributed about FIGURE 12 in a manner deemed best to show their circuit connections. In FIGURE 12, there are eight decks for the six-position switch mechanism 201 of FIGURE 8, labeled with letters A, B, C, D, E, F, G and H, and fifteen decks for switch mechanism 200 of FIGURE 8, labeled 1 through 15.

(I) *Power supply*

The power supply for the circuit of FIGURE 12 is derived from an A-C source to which standard plug 360 is connected. The conductors from plug 360 are in series with a main power switch 361, and the card lock switch 362 operated from microswitch 312 of FIGURES 10 and 11. A power on bulb 363 indicates that switch 361 is closed and power is applied to the unit. Note that bulb 363 is shown by a hexagonal diagram which, hereinafter, is used to designate lamps. A second lamp 364 is an OK lamp showing that card lock switch 362 is closed.

The input A-C power is then applied to an isolating transformer, schematically shown by block 365 which has a plurality of output circuits. The first output circuit is connected to rectifier power supply 366 which has an output voltage of 25 volts D-C, while second and third output circuits are connected to rectifier power supplies 367 and 368 having output voltages of 12 volts D-C and 150 volts D-C, respectively. As will be seen, source 367 serves as the voltage source 46 of FIGURE 1.

(II) *Operating sequence lights*

The last output circuit of transformer 365 is connected to a timer light bank 369 which has five vertical columns of eleven lamps each. The lamps of each column correspond to a respective one of the five tests to be made with the lamps in each column turning on sequentially as the twelve position switch operates. These lamps indicate which test is in progress, and how far the individual test has progressed. Thus, the lamps (not shown) of each column have one terminal connected to a respective contact of contacts 2, 3, 4, 5 and 6 in the deck number 14 of the six-position switch. The other terminals of the lamps of each row of lamps are then connected to eleven respective contacts of deck B of the twelve position switch. The rotating contacts of decks B and 14 are then connected across the output leads 370 and 371 of source 365, whereby the lights of the bank will indicate the progress of the test, as described above.

(III) *External connections*

Six external connection leads extend from the cabinet or housing which encloses the equipment of FIGURE 12. The mechanic connects these leads to the vehicle to be tested. These are starter lead 380, spark plug wire lead 381, spark plug lead 382, hot battery lead 383, distributor lead 384 and ground lead 385. These are all connected to the vehicle before the test, and the mechanic need do nothing other than insert the paper programming card into its holder, and turn the ignition key to a cranking position and hold it in the cranking position until the motor is automatically permitted to start by the test equipment.

(IV) *Switch operating circuits*

The circuit for driving the switch mechanisms of FIGURE 8 is shown in FIGURE 12 as including a solenoid coil operated timing selector structure, shown as block 400, for driving the twelve position contact decks 1 through 14, and solenoid coil operated test selector structure, shown as block 401, for driving the six position contact decks A through H. A pulse generator 402, hereinafter termed a "tripper" is connected to transformer 365 and has negative output conductor 403 and positive output conductor 404. The negative conductor 403 is connected to one side of the solenoid operator of timing selector 400. The timing selector 400 has an internal circuit such that when its output lead 405 is connected to conductor 404, the selector 400 will advance the twelve position decks one full contact position when a pulse is generated in tripper 402.

Conductor 405 is connected to movable contact 406 of relay 407 which has stationary contacts 408, 409, 410 and 411, and a second movable contact 412. Contacts 406 and 409 are normally closed and contacts 412 and 410 are normally closed. Energization of relay coil 413 by closure of reset contact 414 closes contact pairs 406–411 and 412–408 to cycle all decks to the end of a full operating sequence, as will be later understood.

The six position test selector will be advanced one contact position when the movable contact arm of deck A reaches its 12th contact position which connects leads 420 and 421 across the test selector solenoid through normally closed contacts 410–412.

The timing selector control circuit further includes a second relay 420 comprising a relay coil 421, four stationary contacts 422, 423, 424 and 425, and movable contacts 426 and 427. Contact pairs 422–426 and 423–427 are normally closed when coil 421 is deenergized. Energization of coil 421 closes contact pairs 426–424 and 427–425.

Coil 421 is energized by the output of photocell 357 at the end of the cranking test and prevents advance of the system into the dwell test until the engine has started and brought up to sufficient speed. Thus, a high speed tachometer circuit 430, which may be of the type described in FIGURE 6 is operative at the beginning of the dwell test, its output connected to meter 359. Photocell 357 will have an output until the motor speed is at the desired value to close contacts 424–426 and 425–427. The opening of contacts 422–426 prevents the advance of timing selector 400 and closure of contacts 425–427 energizes a red lamp 431 which is observed by a mechanic who sets the vehicle throttle. Once the motor comes up to speed, meter 359 is balanced, photocell 357 and coil 421 are deenergized, and contacts 422–426 and 423–427 close.

The closing of contacts 422–426 permit the timing selector to advance, and the closing of contacts 423–427 turn on a green lamp 432 which advises the mechanic that the motor is up to proper speed.

The last component which influences timer advance is the controlled rectifier 440. Controlled rectifier 440 is in the positive lead 404 and in series with the contact arm of deck C and requires that the mechanic hold the ignition key in the start position for the friction on twenty seconds required for the crank test. Thus, during cranking, decks 11 and 12 are in the first contact position and connect the distributor contact voltage to the gate circuit of controlled rectifier 440 through the control network 461 formed by capacitors 462 and 463 and diodes 464 and 465. This permits controlled rectifier 440 to pass tripping pulses from tripper 402 to timing selector 400 so the timing selector can step around its cycle. However, if the mechanic stops cranking prematurely, the test sequence will stop, since controlled rectifier 440 becomes non-conductive. Note that controlled rectifier 440 is shorted out during the other tests by deck 7.

(V) Function of decks

The detailed operation of the circuit of FIGURE 12 is best understood by a description of the function of the various decks in their various contact positions. The deck functions are described in detail in the following:

(a) *Deck 1.*—Deck 1 serves to connect the output of photocell 358 (which is a variable resistance) to the gate terminals 267–271 of FIGURE 9 to condition lamps 250–259 for operation at the end of the test sequence.

(b) *Deck 2.*—Deck 2 connects positive voltage from source 366 to the test result indicator terminals 280–284 (shown as common terminal 280 in FIGURE 12) to supply energy for controlled rectifier operation when deck 2 is in its 2d to 6th positions.

(c) *Deck 3.*—When the 6th and last contact position is reached in deck 3, and the 11th contact position is reached in deck F, the full test sequence is completed, and source 366 is connected to terminals 285–289 (shown as common terminal 289 in FIGURE 12) so the indicating lights can be fully energized at the end of the test to report the test results.

(d) *Deck 4.*—Deck 4 connects the meter 356 to the output of the various measuring circuits, in combination with deck 6 whereupon the deck positions 2, 3, 4, 5 and 6 correspond to the connection to the meter 356 of the outputs of crank circuit 350; dwell circuit 351; ignition circuit 352; cylinder comparison tachometer circuit 354; and the charging circuit 353.

(e) *Deck 5.*—Deck 5 operates to stop the stepping of deck C when deck 5 is in position 6 (the last test), and deck C reaches position 11 (the end of test 6). This stops the operation of timing selector 400 at the end of a test run.

(f) *Deck 6.*—Deck 6 operates with deck 4, as described for deck 4.

(g) *Deck 7.*—In the 2d, 4th, 5th and 6th contact positions, deck 7 permits connection of tripper 402 to the timing selector 400 by short circuiting controlled rectifier 440. When deck 7 is in the 3rd contact position for the dwell test, the timing selector can be advanced only when the test vehicle motor is up to speed so that the high speed tachometer 430 permits energization of photocell 357 and energization of relay coil 420 to permit relay contacts 422 and 426 to close.

(h) *Deck 8.*—Deck 8 permits the energization of throttle OK lamp 432 in deck position 3 for the dwell test when relay coil 421 is deenergized and the motor is up to speed.

(i) *Deck 9.*—Deck 9 cooperates with deck 13 and both connect source 367 to a white "switch OK" lamp 450 in their 1st contact position. In their 2d, 3d, 4th and 6th positions, they connect source 367 to the individual test circuits 350, 351, 352 and 353, respectively, where it serves the function of meter biasing battery 46 of FIGURE 1.

(j) *Deck 10.*—Deck 10 is used to reset or recycle test selector 401 to the number 1 deck position when reset switch 414 is closed. Thus, reset switch will close contacts 412 and 408 to directly connect tripper 402 to test selector 401 so long as deck 10 is in any of positions 2 through 6.

(k) *Deck 11.*—Deck 11 connects the distributor potential to control network 461 in the 1st and 2nd contact positions so that the ignition key must be held in the crank position by the mechanic in order to fire controlled rectifier 440 to permit the timing selector to advance. In the 2d contact position, capacitor-diode network 461 effectively shorts the distributor to prevent vehicle starting during the crank test; in the 3rd deck position, it connects the distributor lead to one input of the high speed tachometer circuit 430; in the 4th contact position, it connects the distributor to one input of the cylinder selector 355 (corresponding to terminal 162 in FIGURE 7); and in the 5th contact position, it connects the distributor potential to both the cylinder selector 355 (as at terminal 145 in FIGURE 7) and to the input of compression test circuit 354.

(l) *Deck 12.*—Deck 12 operates in connection with deck 11 and connects ground potential to control rectifier 440 in its 1st and 2nd contact position. It connects the distributor to ground in the 2nd contact position; connects ground potential to the input of the dwell circuit 351 and the high speed tachometer 430 in its 3d contact position; and connects a ground input to both circuits 355 and 354 in its 4th and 5th positions (at terminal 144 in FIGURE 7).

(m) *Deck 13.*—See description for deck 9. In addition, deck 13 connects the bottom of relay coil 421 to source 367 in its 3d contact position during the dwell test to stop the advance of the timing selector until the vehicle motor comes up to speed.

(n) *Deck 14.*—Deck 14 drives the timer lights in their predetermined sequence along with deck B, as previously described.

(o) *Deck 15.*—Deck 15 permits direct connection of power to photocell 358 from source 366 through decks 2 and E to indicator 349 in contact positions 2, 3, 4 and 6 of deck 15. In contact position 5 of deck 15 (the compression test) this connection can be made as soon as deck D reaches its position 5 (instead of wating until deck E reaches position 10) and throughout the cylinder comparison process.

(p) *Deck A.*—Deck A operates to advance test selector 401 one position each time it reaches contact position 12, thereby to connect the positive terminal of D-C source 368 to the positive terminal of the test selector through contacts 410–412.

(q) *Deck B.*—See description of deck 14.

(r) *Deck C.*—Deck C permits the passage of a signal from tripper 402 to timing selector 400 when in its contact positions 1–12 except as modified by decks 7 and 5.

(s) *Deck D.*—See description of deck 15.

(t) *Deck E.*—See description of deck 15.

(u) *Deck F.*—Deck F operates to connect lamp operating power to terminals 285–289 (shown as common terminal 285) when deck 3 reaches its 6th contact position and deck F reaches its 11th contact position. This marks the end of the test, and all suitable indicator lamps are turned on in FIGURE 9.

(v) *Deck G.*—Deck G controls cylinder selection in the circuit of FIGURE 7, and is schematically illustrated in FIGURE 12, and is shown in detail in FIGURE 12a. Referring to FIGURE 12a, the standard twelve contact position deck is provided with a rotor or double ended wiper arm 470 which makes simultaneous connection to opposite contacts on the deck. The contacts are then interconnected in such a manner that there are four groups of contacts with three contacts in each group.

The contacts are so arranged that the sequential cylinder disabling plan previously described can be achieved as the wiper arm 470 rotates. The various contacts are shown as having output contact terminals *a*, *b*, *c* and *d*, which are respectively connected to corresponding points *a*, *b*, *c* and *d* in FIGURE 7 related to firing stations 1, 2, 3 and 4, respectively. Rotor 470 is then connected to the gate 467 of controlled rectifier 110. Thus, as the rotor of deck G steps around, six groups of four cylinders each will be selected to determine engine malfunction. That is, in the position shown, both terminals *a* and *b* will first pass pulses from stations 1 and 2 to deactivate cylinders 1, 5, 2 and 6 in an eight cylinder vehicle. In the next contact position, terminals *c* and *a* will permit deactivation of cylinders 1, 5, 3 and 7. The remaining steps follow in a similar manner until the six groups of four cylinders each are tested.

(w) *Deck H.*—Deck H operates in a manner similar to deck 10, but resets the timing selector 400 to its 11th contact position. Thus, depressing reset switch 414 closes contacts 406 and 411 to connect tripper 402 through deck 11 to timing selector 400 until deck position 11 is reached. Note that this is the point from which a new test sequence will start.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A test system for automotive vehicles; said test system comprising a plurality of individual test circuits; a common test meter; a test recording means for recording the reading of said common test meter; a sequential switching means; electrically operable drive means for driving said sequential switching means through a predetermined sequence of operation; and a plurality of output leads connectable to said automotive vehicle in a predetermined manner; said sequential switching means connected to each of said individual test circuits and to said recording means, and to said plurality of output leads and to said common test meter; said sequential switching means including sequentially engaging first contact means for sequentially connecting said individual test circuits to said common test meter; said sequential switching means including second sequentially engaging contact means sequentially connecting selected leads of said plurality of output leads to said individual test circuits; said sequential switching means including third sequentially engaging contacts for connecting said common test meter to said test recording means; said common test meter including a plurality of different calibration means connected to said common test meter by said sequential switching means; said calibration means calibrating the output of said meter according to the test circuit connected to said common test circuit and according to the characteristics of the automotive vehicle under test.

2. The test system as set forth in claim 1; said individual test circuits including a charging test circuit; a dwell test circuit; an ignition test circuit; a starting circuit test circuit; and a compression test circuit.

3. The test system as set forth in claim 1 wherein said common test meter includes biasing means and a meter movement; said biasing means centrally biasing said meter movement; said meter movement connected to a paddle interposed between a light source and a photosensitive device when said meter movement is centered; said paddle being moved from its said interposed position by the output of any of said individual test circuits when said individual test circuit measures a defect in the operation which it monitors, thereby to permit light from said light source to impinge upon said photosensitive device.

4. The test system as set forth in claim 1 wherein said calibration means includes a plurality of auxiliary switching means connected to said common test meter and a respective plurality of auxiliary switch operating means; and a punch card means interposed between said auxiliary switching means and said respective auxiliary switch operating means; selected openings in said punch card permitting selective operation of auxiliary switches having their said auxiliary switch operating means aligned with selected openings in said punch card.

5. The test system as set forth in claim 1 wherein said test recording means includes indicating light means corresponding to each of said individual test circuits whereby said indicating light means is energized in a first and second mode, corresponding to a successful test result and unsuccessful test result, respectively, as measured by said test result meter when connected to said individual test circuit.

6. A test meter comprising a meter movement having a pair of input terminals and a rotatable shaft; a paddle-shaped pointer connected to said shaft and having an enlarged paddle end lying and moving in a plane perpendicular to the axis of said rotatable shaft; a light source positioned on one side of said paddle pointer; a slot shaped aperture aligned with said light source positioned on the opposite side of said paddle; said slot-shaped aperture having a width less than the width of said paddle-shaped pointer and a photosensitive means positioned behind said aperture; said paddle being interposed between said light source and said aperture when a voltage within a predetermined range is applied to said pair of input terminals; said range dependent upon the width of said slot-shaped aperture as compared to the width of said paddle-shaped pointer; said slot-shaped aperture being aligned with a central portion in the range of movement of said paddle-shaped pointer; and a source of biasing voltage connected to said input terminals for biasing said paddle-shaped pointer toward a generally centered position in its path of movement whereby additional input voltage applied to said input terminals can move said pointer to one side or the other of its generally centered position.

7. A compression and ignition test circuit for an automotive type engine; said compression and ignition test circuit including tachometer means for measuring the speed of said engine, high speed switching means operable between an open and closed circuit condition, operating means connected to said high speed switching means and energizable to move said high speed switching means to a closed position for a predetermined interval less than the time interval between subsequent closings of the distributor points of said engine; and energizing means for energizing said operating means in synchronism with a preselected number of operations of said distributor points whereby said energizing means energizes said operating means after a predetermined number of operations of said distributor points thereby to close said high speed switching means to short-circuit said distributor points in a predetermined repetitive pattern to continually disable the operation of at least one cylinder of said engine; and a cylinder selection switching means connected to said energizing means for varying said predetermined repetitive pattern to the selection of a cylinder for disabling other than said at least one cylinder.

8. The device as set forth in claim 7 wherein said cylinder selection switching means includes cylinder selecting switches for at least one-half of the cylinders in said engine.

9. The device as set forth in claim 8 wherein said tachometer circuit comprises a differential tachometer connected across said distributor points; said differential tachometer comprising a resistor and first capacitor connected in parallel with one another; a meter having a movement having input terminals; and a second capacitor connected in a closed series circuit with said input terminals and said first capacitor, whereby said meter movement is deflected for a short time if motor speed changes when different cylinders are disabled.

10. A compression and ignition test circuit for an automotive type engine; said engine including a plurality of cylinders and an ignition circuit connected to said cylinders including a pair of distributor points; said test circuit including: a controlled rectifier having an anode, cathode and terminal connected across said distributor points and a gate terminal; a pulse generator having input terminals connected to said distributor points and an output circuit connected to said gate terminal of said controlled rectifier; said pulse generator generating one output pulse in synchronism with a predetermined number of opening operations of said distributor points; and pulse advancing means for shifting the point in the pattern of distributor point operation at which said one output pulse is generated; and tachometer means for measuring the speed of said engine as different cylinders of said engine are repetitively deactivated by the repetitive firing of said controlled rectifier and the subsequent repetitive short-circuiting of said distributor points.

11. The device as set forth in claim 10 wherein said pulse generator comprises a ring counter having a pair of input terminals and a plurality of output terminals; said pair of input terminals connected across said distributor points; said pulse advancing means comprising switching means for selectively connecting one of said output terminals to said gate terminal of said controlled rectifier.

12. A test result indicator for indicating the test result of a measuring circuit and including a failure indicating lamp, a success indicating lamp, a first voltage source, a second voltage source, a switching means, a first resistor, a second resistor, a controlled rectifier and a diode; said first voltage source connected in closed series with said first resistor, said failure indicating lamp, the anode and cathode terminals of said controlled rectifier; said second voltage source connected in closed series with said switching means, said second resistor and said success indicating lamp; said diode connected in closed series with said controlled rectifier and said success indicating lamp; said measuring circuit connected to the gate of said controlled rectifier; said first and second voltage sources connected in closed series opposition circuit with said first resistor; whereby, if said measuring circuit output is sufficiently high to fire said controlled rectifier, said controlled rectifier will conduct through said first resistor and said failure indicating lamp without illuminating said lamp until said switching means is closed and said failure indicating lamp is illuminated by current from said second source; and whereby if the output of said measuring circuit is insufficient to fire said controlled rectifier, said success indicating lamp will be illuminated by said second voltage source when said switching means is closed.

References Cited

UNITED STATES PATENTS

| 2,366,889 | 1/1945 | Westberg et al. | |
| 2,870,400 | 1/1959 | Hickok | 200—46 X |
| 2,986,032 | 5/1961 | Heyer | 73—117.2 |
| 3,010,026 | 11/1961 | Schake | 250—231 |
| 3,238,772 | 3/1966 | Pellicciotti | 73—117 |

OTHER REFERENCES

Computer Tests Transmissions, from American Machinist, Dec. 20, 1965, pages 83–85, TJ 1. A4.

RICHARD C. QUEISSER, *Primary Examiner.*

JERRY W. MYRACLE, *Assistant Examiner.*